United States Patent [19]

Bartlett

[11] Patent Number: 4,923,097

[45] Date of Patent: May 8, 1990

[54] AEROSOL PAINT COMPOSITIONS

[75] Inventor: Philip L. Bartlett, Wilmington, Del.

[73] Assignee: E. I. DuPont De Nemours and Company, Wilmington, Del.

[21] Appl. No.: 403,834

[22] Filed: Aug. 11, 1989

Related U.S. Application Data

[63] Continuation of Ser. No. 304,573, Jan. 31, 1989, abandoned, which is a continuation of Ser. No. 144,581, Dec. 30, 1987, abandoned, which is a continuation of Ser. No. 893,881, Apr. 6, 1986, abandoned.

[51] Int. Cl.$^5$ .......................... B65D 83/00; C08L 1/08
[52] U.S. Cl. ..................................... 222/394; 106/188; 106/252
[58] Field of Search ................. 222/394; 106/188, 252

[56] References Cited

U.S. PATENT DOCUMENTS

| | | | |
|---|---|---|---|
| 3,413,254 | 11/1968 | Gander | 260/33.2 |
| 3,884,828 | 5/1975 | Butler | 252/68 |
| 4,209,438 | 6/1980 | Okada et al. | 524/604 |
| 4,258,140 | 3/1981 | Horacek et al. | 521/131 |
| 4,384,661 | 5/1983 | Page et al. | 524/378 |
| 4,396,523 | 8/1983 | Blume et al. | 252/174.11 |
| 4,422,877 | 12/1983 | Spitzer et al. | 106/188 |
| 4,450,253 | 5/1984 | Suk | 524/378 |
| 4,482,662 | 11/1984 | Rapaport et al. | 524/903 |
| 4,518,734 | 5/1985 | Brouillette et al. | 524/378 |

FOREIGN PATENT DOCUMENTS

| | | | |
|---|---|---|---|
| 51-30095 | 8/1976 | Japan . | |
| 51-30096 | 8/1976 | Japan . | |
| 57-121070 | 7/1982 | Japan | 524/378 |
| 59-52913 | 12/1984 | Japan . | |
| 60-22022 | 5/1985 | Japan . | |

OTHER PUBLICATIONS

Hackh's Chemical Dictionary–p. 425.

Primary Examiner—Joseph L. Schofer
Assistant Examiner—N. Sarofim

[57] ABSTRACT

A solvent-based (non-aqueous) aerosol paint containing dimethyl ether as solvent or solvent and propellant and a film-forming paint resin formulation is disclosed.

13 Claims, No Drawings

AEROSOL PAINT COMPOSITIONS

This application is a continuation of application Ser. No. 304,573 filed Jan. 31, 1989, now abandoned, which is a continuation of application Ser. No. 144,581 filed Dec. 30, 1987, now abandoned, which is a continuation of application Ser. No. 893,881 filed Aug. 6, 1986 now abandoned.

BACKGROUND OF THE INVENTION

This invention relates to solvent-based (non-aqueous) aerosol paints containing dimethyl ether as solvent or solvent and propellant.

A solvent-based aerosol paint contains both a propellant and a film-forming paint resin formulation. Most commercial solvent-based aerosol paints contain mixtures of low molecular weight hydrocarbons as the propellant; most commonly, a blend of propane and isobutane is used. A paint resin formulation generally contains a paint resin(s), pigments, diluting and coalescing or film-forming solvents, and various additives, such as drying agents, thickeners, surfactants, antiskinning agents, plasticizers, mildewcides, mar-resistant agents, antiflooding agents, etc.

To form a uniform, smooth coating when a solvent-based aerosol paint is applied to a surface and allowed to dry, the paint resin(s) in the paint must be in a single phase with the solvents and propellant during application. The propellant can also function as a solvent in the paint. The other ingredients in the paint resin formulation, i.e., pigments and additives, may be dispersed or suspended in the paint; however, it is important that the paint resin(s) be in solution for satisfactory application of paints to substrates.

The low molecular weight hydrocarbon propellants are quite poor solvents for many paint resins and additional relatively powerful solvents are required in commercial aerosol paints as components of the diluting and coalescing or film-forming solvents in order to solubilize these resins. The solvents commonly used in solvent-based aerosol paints for solubilization of the paint resins are aromatic compounds such as toluene or xylene, various ethylene glycol ethers and methylene chloride. These compounds are good solvents and produce excellent solvent-based aerosol paints.

A problem with the use of these solvents, however, is their potential toxicity to humans when exposure results during normal use or when deliberate abuse occurs (inhalation). In many instances, the ethylene glycol ethers are being replaced in aerosol paints with the safer propylene glycol ether solvents. However, great difficulty has been experienced in finding good substitutes for the aromatic solvents and methylene chloride and special handling, storage and application procedures may be required in the near future when using aerosol paints which contain these solvents.

The introduction of dimethyl ether (DME) as an aerosol propellant has provided the opportunity to formulate attractive, low-toxicity solvent-based (non-aqueous) aerosol paints without requiring the use of toxic aromatic solvents or methylene chloride.

SUMMARY OF THE INVENTION

A solvent-based aerosol paint has been discovered comprising an effective amount of DME as a solvent or solvent and propellant and a non-aqueous paint resin formulation which contains a paint resin(s) which without dimethyl ether would require the use of a powerful solvent to solubilize the paint resin(s) when a blend of low-molecular weight hydrocarbons is the only propellant.

DETAILED DESCRIPTION

According to the present invention, DME has been found to be unexpectedly useful as the solvent or solvent and propellant in a non-aqueous aerosol paint by providing to the paint sufficient solubility characteristics to ensure that the resin/solvent/propellant system will be a single phase. DME provides the means for achieving this necessary aim without the need for the incorporation of aromatic solvents such as toluene and xylene or methylene chloride which are needed to solubilize many paint resins in hydrocarbon-propelled paints. Without the resin(s) being soluble in the solvent/propellant portion of the paint, satisfactory paint films on substrates are not possible.

By solvent-based aerosol paint is meant a non-aqueous paint capable of being applied to a surface from an aerosol container which contains both a propellant and a paint resin formulation. A paint resin formulation generally contains a paint resin(s), pigments, diluting and coalescing or film-forming solvents, and various additives, such as drying agents, thickeners, surfactants, antiskinning agents, plasticizers, mildewcides, mar-resistant agents, antiflooding agents, etc.

By paint resin is meant a polymeric material which is soluble in the paint resin/solvent/propellant system to produce a non-aqueous solution which can be sprayed satisfactorily from an aerosol can and which upon drying provides a flexible, durable, non-tacky film of the desired gloss.

By effective amount of DME is meant an amount of DME which causes the paint resin(s), any other solvents and propellants present, and the DME to form a single phase system in a non-aqueous solvent-based aerosol paint.

By powerful solvent is meant a liquid or mixture of liquids which has a Kauri-Butanol No. of about 90 or greater or which will cause a single phase system of the solvent(s), the paint resin(s), and the propellant to be formed when a mixture of low-molecular weight hydrocarbons is used as the only propellant in a solvent-based aerosol paint. Examples of these solvents are aromatic compounds such as toluene or xylene, various ethylene glycol ethers and methylene chloride.

By low-molecular weight hydrocarbons is meant aliphatic hydrocarbons containing one to six carbon atoms and mixtures thereof. Most commonly in the United States, the term hydrocarbon propellant is used to describe blends of propane and isobutane. Mixtures of hydrocarbons exert partial vapor pressures which, in accordance with the ideal gas laws, are dependent upon their mole fraction contents of a particular mixture.

Examples of paint resins for which DME has been found to be unexpectedly useful as a solvent or solvent and propellant are styrene-modified alkyd resins, vinyl toluene-modified alkyd resins, acrylic-modified alkyd resins, phenol-formaldehyde/rosin-modified alkyd resins, silicone-modified alkyd resins, short-oil and oil-free alkyd resins, chain-stopped alkyd resins, nitrocellulose resins, silicone resins, and acrylic resins. This list is not meant to be exhaustive or limiting and other resins which are soluble in DME and which without DME would require the use of powerful solvents to solubilize them in solvent-based aerosol paints when low-molecular weight hydrocarbons are the only propellants are intended to be included in this invention.

It is surprising and unexpected that DME should be such a good solvent for the paint resins of this invention. The Kauri-Butanol No. is an indication of the relative solvent power of a particular liquid; the higher the Kauri Butanol No. the better the solvency of the product. The Kauri Butanol No. for DME in 60; whereas the Kauri Butanol Nos. for toluene and methylene chloride are 105 and 136, respectively. With this large difference between solubility numbers, one would expect DME to be less effective as a solvent for these paint resins than aromatic solvents and methylene chloride when they are used with hydrocarbon propellants in solvent-based aerosol paints.

It is not a requirement of the invention that DME be the only propellant in the aerosol paint. DME performs satisfactorily in conjunction with fluorocarbons such as difluorochloromethane (FC-22) and hydrocarbons. Thus, the FC-22/DME azeotrope containing 40 wt. percent FC-22 and 60 wt. percent DME functions well as an aerosol paint propellant while allowing the DME to provide both propellancy and solvency benefits. Simularly, DME can be used with hydrocarbons such as A-70 (about 41.9 wt. percent propane and 58.1 wt. percent isobutane with a vapor pressure of 70 psig at 70 degrees Fahrenheit) in various ratios. For example, a blend of 60 wt. percent DME and 40 wt. percent A-70 provides excellent and economical paint resin solubility.

An additional important part of this invention is the property of DME to allow the incorporation of solvent components which reduce the flammability of aerosol paints. Thus, methyl chloroform can be used with DME to reduce the flammability hazard of non-aqueous aerosol paints in use and particularly during warehouse storage. As an additional example, the incorporation of FC-22 in aerosol paints reduces their flammability since FC-22 is a non-flammable propellant.

In the aerosol paint of this invention, the DME may be present in an amount of about 10–60 wt. percent, preferrably about 15–45 wt. percent, and more preferrably about 18–45 wt. percent. The paint resin(s) may be present in an amount of about 5–30 wt. percent, preferrably about 7.5–15 wt. percent. In addition to DME, other propellants such as FC-22 or A-70 may be present in the paint in an amount of about 5–30 wt. percent, preferrably about 10–20 wt. percent. Also, in addition to DME, methyl chloroform can be present in an amount of about 10–60 wt. percent, preferrably about 20 to 40 wt. percent. Other ingredients such as pigments, surfactants, thickeners, driers, antiskinning agents, plasticizers, mildewcides, solvents such as propylene glycol monomethyl ether, VM and P naphtha, esters, alcohols, ketones and mineral spirits, and solvents which are incidental to both the paint resin(s) and other paint constituents to facilitate their handling may be included to complete the aerosol paint.

If DME is the only propellant present in the solvent-based aerosol paint of this invention, the DME may be present in an amount of about 25–45 wt. percent based on the total weight of the aerosol paint.

A particularly preferred paint according to the present invention is:

| Ingredient | Wt. % |
| --- | --- |
| Organic Red Pigment[1] | 10.0 |
| Vinyl Toluene-modified | 15.0 |
| Alkyd Resin[2] | |
| Methyl Chloroform | 29.5 |
| PGME | 10.0 |
| Surfactant[3] | 0.5 |
| DME | 35.0 |
| Vapor Pressure at 70° F., 37 PSIG | |

[1] "Tint Ayd" ST-8673 (as purchased)
[2] "Styresol" 13-040 (as purchased)
[3] "Disperse Ayd" #1 (as purchased)

The following examples will help to illustrate the practice of the present invention.

EXAMPLES

Solubility Tests

Solubility tests were conducted in 4 oz. plastic coated, glass pressure bottles. In these tests, the resin and solvents were combined in the pressure bottle and the aerosol valve was attached or crimped. Prior to attaching the valve, the bottle was purged of air with the propellant to be used in the solubility test. The propellant was introduced into the bottle as a liquid through the aerosol valve. Volume amounts corresponding to the weights of the propellants were calculated prior to loading, and a glass, calibrated pressure buret was used to measure and transfer the liquids from storage cylinders to the bottle. A nitrogen gas pressure of 100 psig was applied to the buret to aid in transferring the liquids from the buret to the bottle. After the propellant was loaded, the bottle was weighed and the weight of propellant recorded.

The solubility of the resin in the solvent/propellant system was visually determined by inspecting the pressure bottle for precipitated resin. If the contents of the pressure bottle were clear, the resin was determined to be soluble. Any sediment or precipitate resulted in a rating of insoluble.

Paint Tests

Paint samples were prepared in 3-piece lined 6 oz. aerosol can with Newman Green R-10-123 Valves (0.013 vapor tap and 120-20-18 actuator). The procedure for loading the samples into aerosol cans was the same as for the resin solubility tests, except glass agitating balls were placed in the cans to facilitate dispersion of pigments and other insolubles prior to spraying. The quality of the paints, as coatings, was determined by application to standard paint cards.

Chemicals Used in Tests

The following tables list the chemicals which were used in the above described tests.

| Designation | Solvents Structure/Properties | Source |
| --- | --- | --- |
| UCAR PM Solvent | Propylene glycol monomethyl ether (PGME) | Union Carbide Corp. |
| UCAR PM Acetate | Propylene glycol monomethyl ether acetate (PGMEA) | Union Carbide Corp. |
| VM and P Naphtha | 52° F. flash point (TCC) | — |
| Mineral Spirits | 10° F. flash point (TCC) | — |
| "Aerothene" TT | Methyl chloroform | Dow Chemical Co. |

-continued

| Designation | | Source |
|---|---|---|
| DBE | Mixture of dimethyl adipate, glutarate and succinate | Du Pont Co. |

Pigments

| Designation* | Color |
|---|---|
| "Tint Ayd" ST-8673 | Deep Organic Red |
| "Tint Ayd" ST-8317 | Tinting Black |
| "Tint Ayd" ST-8451 | Light Lemon (Yellow) |
| "Tint Ayd" ST-8703 | Phthalo Green |
| "Tint Ayd" ST-8003 | Titanium Dioxide (White) |
| "Tint Ayd" ST-8298 | Phthalo Blue |
| "Tint Ayd" ST-8610 | Red Oxide |

*Daniel Products Company

Resins

| Designation | Composition | Source |
|---|---|---|
| "Beckosol" 10-001 | Phenol-formaldehyde/rosin-modified alkyd (50% AI in mineral spirits) | Reichhold Chemicals, Inc. |
| "Beckosol" 10-638 | Silicone-modified alkyd (60% AI in mineral spirits) | Reichhold Chemicals, Inc. |
| "Beckosol" 12-005 | Short-oil alkyd (50% AI in Xylene) | Reichhold Chemicals, Inc. |
| "Beckosol" 12-101 | Chain-stopped alkyd (50% AI in Xylene) | Reichhold Chemicals, Inc. |
| "Styresol" 13-031 | Styrene-modified alkyd (50% AI in Xylene) | Reichhold Chemicals, Inc. |
| "Styresol" 13-040 | Vinyl toluene-modified alkyd (50% AI in VM and P Naphtha) | Reichhold Chemicals, Inc. |
| "Lustrasol" 13-046 | Acrylic-modified alkyd (50% AI in Xylene) | Reichhold Chemicals, Inc. |
| "Elvacite" 2016 | Acrylic (100% AI) | DuPont Co. |
| "Kepolac" SSL-A | Nitrocellulose (about 15% AI in mixed solvent) | Henkel Corp. |
| Dow Corning #804 | Silicone (60% AI in toluene) | Dow Corning Corp. |
| Dow Corning #840 | Silicone (60% AI in toluene) | Dow Corning Corp. |

Note: "AI" means "active ingredient".

Surfactants

| Designation | Composition | Source |
|---|---|---|
| "Triton" X-15 | Octylphenoxy polyethoxy ethanol | Rohm & Haas Co. |
| FC-430 | Fluorosurfactant | 3M Company |
| "Disperse-Ayd" 1 | Proprietary | Daniel Products Co. |
| "Disperse-Ayd" 6 | Proprietary | Daniel Products Co. |
| "Disperse-Ayd" 8 | Proprietary | Daniel Products Co. |
| "Disperse-Ayd" XL 1/80 | Proprietary | Daniel Products Co. |

The following tables are separated into two groups. The Paint Tables 1-15 show successful application to substrates of solvent-based aerosol paints which contain DME as solvent or solvent and propellant. The Solubility Tables 1-26 show the solubility of various paint resins when DME is present in the mixture. Both groups of tables use identified ingredients from the above listing of "Chemicals Used in Tests" with preparation and testing procedures as described in "Solubility Tests" and "Paint Tests." All weight percentages for the indicated ingredients are on an "as is" or "as purchased" basis as listed in "Chemicals Used in Tests" above.

PAINT TABLE 1

RED PAINT FORMULATIONS

| Formulation | Wt. % | | | |
|---|---|---|---|---|
| | 1 | 2 | 3 | 4 |
| Organic Red Pigment | 5.0 | 10.0 | 5.0 | 10.0 |
| Styrene-modified Alkyd Resin | 15.0 | 15.0 | — | — |
| Vinyl Toluene-modified Alkyd Resin | — | — | 15.0 | — |
| Acrylic-modified Alkyd Resin | — | — | — | 15.0 |
| VM and P Naphtha | 24.5 | 19.5 | 24.5 | 19.5 |
| PGME | 10.0 | 10.0 | 10.0 | 10.0 |
| "Triton" X-15 | 0.5 | 0.5 | 0.5 | 0.5 |
| DME | 45.0 | 45.0 | 45.0 | 45.0 |
| Vapor Pressure at 70° F. PSIG | 47 | 48 | 45 | 47 |
| Appearance | Glossy, quick drying | Glossy, quick drying, excellent hiding power | Glossy, quick drying | Glossy, quick drying, excellent coverage |

PAINT TABLE 2

BLACK PAINT FORMULATIONS

| Formulation | Wt. % | |
|---|---|---|
| | 1 | 2 |
| Black Pigment | 10.0 | 10.0 |
| Styrene-modified Alkyd Resin | 15.0 | — |
| Vinyl Toluene-modified Alkyd Resin | — | 15.0 |
| VM and P Naphtha | 19.5 | 19.5 |
| PGME | 10.0 | 10.0 |
| "Triton" X-15 | 0.5 | 0.5 |
| DME/A-70 (60/40) | 45.0 | 45.0 |
| Vapor Pressure at 70° F. PSIG | 53 | 52 |
| Appearance | Glossy, quick drying | Glossy, quick drying |

PAINT TABLE 3

YELLOW PAINT FORMULATION

| Formulation | Wt. % |
|---|---|
| | 1 |
| Light Lemon Pigment | 10.0 |
| Styrene-modified Alkyd Resin | 15.0 |
| VM and P Naphtha | 24.5 |
| PGME | 5.0 |
| "Triton" X-15 | 0.5 |
| DME | 45.0 |
| Vapor Pressure at 70° F. PSIG | 50 |
| Appearance | Glossy, quick drying, excellent hiding power |

PAINT TABLE 4

YELLOW PAINT FORMULATIONS

| Formulation | Wt. % | | |
|---|---|---|---|
| | 1 | 2 | 3 |
| Light Lemon Pigment | 10.0 | 10.0 | 10.0 |
| Vinyl Toluene-modified Alkyd Resin | 15.0 | 15.0 | 15.0 |
| VM and P Naphtha | 34.5 | 34.5 | 34.5 |

PAINT TABLE 4-continued

YELLOW PAINT FORMULATIONS

| Formulation | Wt. % | | |
|---|---|---|---|
| | 1 | 2 | 3 |
| PGME | 10.0 | 10.0 | 10.0 |
| "Triton" X-15 | 0.5 | 0.5 | 0.5 |
| DME | 30.0 | — | — |
| FC-22/DME (40/60) | — | 30.0 | — |
| DME/A-70 (60/40) | — | — | 30.0 |
| Vapor Pressure at 70° F. PSIG | 36 | 30 | 40 |
| Appearance | Glossy, quick drying, good hiding power | | |

PAINT TABLE 5

GREEN PAINT FORMULATIONS

| Formulation | Wt. % | |
|---|---|---|
| | 1 | 2 |
| Phthalo Green Pigment | 10.0 | 10.0 |
| Styrene-modified Alkyd Resin | 15.0 | — |
| Vinyl Toluene-modified Alkyd Resin | — | 15.0 |
| VM and P Naphtha | 19.5 | 19.5 |
| PGME | 10.0 | 10.0 |
| "Triton" X-15 | 0.5 | 0.5 |
| FC-22/DME (40/60) | 45.0 | 45.0 |
| Vapor Pressure at 70° F. PSIG | 41 | 41 |
| Appearance | Glossy, quick drying | Glossy, quick drying |

PAINT TABLE 6

PAINT FORMULATIONS

| Formulation | Wt. % | | | | | |
|---|---|---|---|---|---|---|
| | 1 | 2 | 3 | 4 | 5 | 6 |
| White Pigment | 10.0 | — | — | 10.0 | — | — |
| Phthalo Green Pigment | — | 10.0 | — | — | 10.0 | — |
| Phthalo Blue Pigment | — | — | 10.0 | — | — | 10.0 |
| Styrene-mod. Alkyd Resin | 15.0 | 15.0 | 15.0 | — | — | — |
| Vinyl Toluene-modified Alkyd Resin | — | — | — | 15.0 | 15.0 | 15.0 |
| VM and P Naphtha | 19.5 | 19.5 | 19.5 | 19.5 | 19.5 | 19.5 |
| PGME | 10.0 | 10.0 | 10.0 | 10.0 | 10.0 | 10.0 |
| "Triton" X-15 | 0.5 | 0.5 | 0.5 | 0.5 | 0.5 | 0.5 |
| DME | 45.0 | 45.0 | 45.0 | 45.0 | 45.0 | 45.0 |
| Vapor Pressure at 70° F. PSIG | 48 | 48 | 48 | 49 | 47 | 48 |
| Appearance | All glossy, quick drying | | | | | |

PAINT TABLE 7

BLUE PAINT FORMULATION

| Formulation | Wt. % |
|---|---|
| | 1 |
| Phthalo Blue Pigment | 10.00 |
| Vinyl Toluene-modified Alkyd Resin | 15.00 |
| Methyl Chloroform | 34.95 |
| FC-430 | 0.05 |
| DME | 40.00 |
| Vapor Pressure at 70° F. PSIG | 40 |
| Appearance | Glossy, quick drying |

PAINT TABLE 8

RED PAINT FORMULATIONS

| Formulation | Wt. % | | | | |
|---|---|---|---|---|---|
| | 1 | 2 | 3 | 4 | 5 |
| Organic Red Pigment | 10.00 | 10.00 | 10.00 | 10.00 | 10.00 |
| Styrene-mod. Alkyd Resin | 15.00 | — | — | — | — |
| Vinyl Toluene-mod. alkyd resin | — | 5.00 | — | 15.00 | 15.00 |
| Acrylic-mod. Alkyd Resin | — | — | 15.00 | — | — |
| PGME | 5.00 | 5.00 | 5.00 | — | — |
| Methyl Chloroform | 34.95 | 34.95 | 34.95 | 44.95 | 39.95 |
| FC-430 | 0.05 | 0.05 | 0.05 | 0.05 | 0.05 |
| DME | 35.00 | 35.00 | 35.00 | 30.00 | 35.00 |
| Vapor Pressure at 70° F. PSIG | 36 | 35 | 35 | 32 | 36 |
| Appearance | High gloss, quick drying | | | | |

PAINT TABLE 9

BLUE PAINT FORMULATIONS

| Formulation | Wt. % | | | | |
|---|---|---|---|---|---|
| | 1 | 2 | 3 | 4 | 5 |
| Phthalo Blue Pigment | 10.00 | 10.00 | 10.00 | 10.00 | 10.00 |
| Styrene-mod. Alkyd Resin | 15.00 | — | — | — | — |
| Vinyl Toluene-mod. Alkyd Resin | — | 15.00 | — | 15.00 | 15.00 |
| Acrylic-mod. Alkyd Resin | — | — | 15.00 | — | — |
| PGME | 5.00 | 5.00 | 5.00 | — | — |
| Methyl Chloroform | 34.95 | 34.95 | 34.95 | 44.95 | 39.95 |
| FC-430 | 0.05 | 0.05 | 0.05 | 0.05 | 0.05 |
| DME | 35.00 | 35.00 | 35.00 | 30.00 | 35.00 |
| Vapor Pressure at 70° F. PSIG | 35 | 35 | 34 | 31 | 35 |
| Appearance | High gloss, quick drying | | | | |

PAINT TABLE 10

BLUE PAINT FORMULATIONS

| Formulation | Wt. % | | | |
|---|---|---|---|---|
| | 1 | 2 | 3 | 4 |
| Phthalo Blue Pigment | 10.0 | 10.0 | 10.0 | 10.0 |
| Vinyl Toluene-mod. Alkyd Resin | 15.0 | 15.0 | 15.0 | 15.0 |
| VM and P naphtha | 19.5 | 19.5 | 19.5 | 19.5 |
| PGME | 10.0 | 10.0 | 10.0 | 10.0 |
| "Disperse Ayd" #1 | 0.5 | — | — | — |
| "Disperse Ayd" #6 | — | 0.5 | — | — |
| "Disperse Ayd" #8 | — | — | 0.5 | — |
| "Disperse Ayd" XL-1/80 | — | — | — | 0.5 |
| DME | 45.0 | 45.0 | 45.0 | 45.0 |
| Vapor Pressure at 70° F. PSIG | 42 | 41 | 41 | 41 |
| Appearance | Glossy, quick drying | | | |

PAINT TABLE 11

PAINT FORMULATIONS

| Formulation | Wt. % | | |
|---|---|---|---|
| | 1 | 2 | 3 |
| Red Oxide Pigment | 10.0 | 10.0 | 10.0 |
| Silicone Resin* | 12.5 | — | 12.5 |
| Silicone Resin** | — | 12.5 | — |
| Methyl Chloroform | 32.0 | 32.0 | 32.0 |
| PGME | 10.0 | 10.0 | 10.0 |

PAINT TABLE 11-continued

PAINT FORMULATIONS

| Formulation | Wt. % | | |
|---|---|---|---|
| | 1 | 2 | 3 |
| "Disperse Ayd" #1 | 0.5 | 0.5 | 0.5 |
| DME | 45.0 | 45.0 | — |
| FC-22/DME (40/60) | — | — | 35.0 |
| Vapor Pressure at 70° F. PSIG | 37 | 38 | 32 |
| Appearance | Glossy, quick drying | | |

*Dow Corning #804
**Dow Corning #840

PAINT TABLE 12

BLUE PAINT FORMULATIONS

| Formulation | Wt. % | | | | | | | |
|---|---|---|---|---|---|---|---|---|
| | 1 | 2 | 3 | 4 | 5 | 6 | 7 | 8 |
| Phthalo Blue Pigment | 10.0 | 10.0 | 10.0 | 10.0 | 10.0 | 10.0 | 10.0 | 10.0 |
| Vinyl Toluene-modified Alkyd Resin | 15.0 | 15.0 | 15.0 | 15.0 | 15.0 | 15.0 | 15.0 | 15.0 |
| Methyl Chloroform | 29.5 | 29.5 | 29.5 | 29.5 | 29.5 | 29.5 | 29.5 | 29.5 |
| PGME | 10.0 | 10.0 | 10.0 | 10.0 | — | — | — | — |
| DBE | — | — | — | — | 10.0 | 10.0 | 10.0 | 10.0 |
| "Disperse Ayd" #1 | 0.5 | — | — | — | 0.5 | — | — | — |
| "Disperse Ayd" #6 | — | 0.5 | — | — | — | 0.5 | — | — |
| "Disperse Ayd" #8 | — | — | 0.5 | — | — | — | 0.5 | — |
| "Disperse Ayd" XL-1/80 | — | — | — | 0.5 | — | — | — | 0.5 |
| DME | 35.0 | 35.0 | 35.0 | 35.0 | 35.0 | 35.0 | 35.0 | 35.0 |
| Vapor Pressure at 70° F. PSIG | 36 | 37 | 36 | 36 | 36 | 37 | 37 | 36 |
| Appearance | High gloss, quick drying #1 to 4; slow drying #5 to 8. | | | | | | | |

PAINT TABLE 13

RED PAINT FORMULATIONS

| Formulation | Wt. % | | |
|---|---|---|---|
| | 1 | 2 | 3 |
| Organic Red Pigment | 10.0 | 10.0 | 10.0 |
| Acrylic Resin | 15.0 | 15.0 | 15.0 |
| VM and P Naphtha | 29.5 | — | — |
| PGME | 10.0 | 10.0 | — |
| Methyl Chloroform | — | 29.5 | 39.5 |
| "Disperse Ayd" #1 | 0.5 | 0.5 | 0.5 |
| DME | 35.0 | 35.0 | 35.0 |
| Vapor Pressure at 70° F. PSIG | 36 | 37 | 36 |
| Appearance | High gloss, quick drying | | |

PAINT TABLE 14

PAINT FORMULATIONS

| Formulation | Wt. % | |
|---|---|---|
| | 1 | 2 |
| White Pigment | 15.0 | — |
| Phthalo Green Pigment | — | 5.0 |
| Acrylic Resin | 7.5 | 7.5 |
| Methyl Chloroform | 32.0 | 42.0 |
| PGME | 10.0 | 10.0 |
| "Disperse Ayd" #1 | 0.5 | 0.5 |
| DME | 35.0 | 35.0 |
| Vapor Pressure at 70° F., PSIG | 36 | 36 |
| Appearance | Medium gloss, quick drying | High gloss, quick drying |

PAINT TABLE 15

WHITE PAINT FORMULATIONS

| Formulation | Wt. % | | | |
|---|---|---|---|---|
| | 1 | 2 | 3 | 4 |
| White Pigment | 15.0 | 15.0 | 15.0 | 15.0 |
| Styrene-mod. Alkyd Resin | 15.0 | 15.0 | — | — |
| Vinyl Toluene-mod. Alkyd Resin | — | — | 15.0 | 15.0 |
| VM & P Naphtha | — | 24.5 | — | 24.5 |
| Methyl Chloroform | 24.5 | — | 24.5 | — |
| PGME | 10.0 | 10.0 | 10.0 | 10.0 |
| "Disperse Ayd" #1 | 0.5 | 0.5 | 0.5 | 0.5 |
| DME | 35.0 | 35.0 | 35.0 | 35.0 |
| Vapor Pressure at 70° F., PSIG | 36 | 37 | 36 | 38 |
| Appearance | Glossy, quick drying | Very glossy, quick drying | Glossy, quick drying | Very glossy, quick drying |

TABLE 1

SOLUBILITY

| Formulation | Wt. % | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Styrene-modified Alkyd resin | 15.0 | 10.0 | 10.0 | 10.0 | 10.0 | 10.0 | 10.0 | 10.0 | 15.0 | 15.0 | 30.0 | 60.0 |
| VM and P naphtha | 40.0 | 40.0 | 20.0 | 55.0 | 30.0 | 55.0 | 30.0 | 40.0 | 30.0 | 70.0 | 25.0 | 40.0 |
| Mineral spirits | — | — | 20.0 | — | 25.0 | — | 25.0 | — | — | — | — | — |
| PGME | — | 5.0 | 5.0 | 5.0 | 5.0 | — | — | — | 10.0 | — | — | — |
| PGMEA | — | — | — | — | — | 5.0 | 5.0 | 5.0 | — | — | — | — |
| DME | 45.0 | 45.0 | 45.0 | 30.0 | 30.0 | 30.0 | 30.0 | 45.0 | 45.0 | 15.0 | 45.0 | 40.0 |
| Solubility | Sol. | Sol. | Sol. | Sol. | Sol. | Sol. | Sol. | Sol. | Sol. | Sol. | Sol. | Sol. |

SOLUBILITY TABLE 2

| Formulation | Wt. % | | | |
|---|---|---|---|---|
| | 1 | 2 | 3 | 4 |
| Styrene-modified alkyd resin | 5.0 | 10.0 | 10.0 | 15.0 |
| VM and P naphtha | 40.0 | 40.0 | 40.0 | 30.0 |
| PGME | — | 5.0 | — | 10.0 |
| PGMEA | — | — | 5.0 | — |
| FC-22/DME (40/60) | 45.0 | 45.0 | 45.0 | 45.0 |
| Solubility | Sol. | Sol. | Sol. | Sol. |

SOLUBILITY TABLE 3

| Formulation | Wt. % | |
|---|---|---|
| | 1 | 2 |
| Styrene-modified alkyd resin | 15.0 | 15.0 |
| VM and P naphtha | 40.0 | 30.0 |

SOLUBILITY TABLE 3-continued

| Formulation | Wt. % | |
|---|---|---|
| | 1 | 2 |
| PGME | — | 10.0 |
| DME/A-70 (60/40) | 45.0 | 45.0 |
| Solubility | Insol. | Sol. |

TABLE 4

| Formulation | SOLUBILITY Wt. % | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Vinyl toluene-modified alkyd resin | 15.0 | 10.0 | 10.0 | 10.0 | 10.0 | 10.0 | 10.0 | 10.0 | 15.0 | 15.0 | 30.0 | 60.0 |
| VM and P naphtha | 40.0 | 40.0 | 20.0 | 55.0 | 30.0 | 55.0 | 30.0 | 40.0 | 30.0 | 70.0 | 25.0 | — |
| Mineral spirits | — | — | 20.0 | — | 25.0 | — | 25.0 | — | — | — | — | — |
| PGME | — | 5.0 | 5.0 | 5.0 | 5.0 | — | — | — | 10.0 | — | — | — |
| PGMEA | — | — | — | — | — | 5.0 | 5.0 | 5.0 | — | — | — | — |
| DME | 45.0 | 45.0 | 45.0 | 30.0 | 30.0 | 30.0 | 30.0 | 45.0 | 45.0 | 15.0 | 45.0 | 45.0 |
| Solubility | Sol. | Sol. | Sol. | Sol. | Sol. | Sol. | Sol. | Sol. | Sol. | Sol. | Sol. | Sol. |

SOLUBILITY TABLE 5

| Formulation | Wt. % | | |
|---|---|---|---|
| | 1 | 2 | 3 |
| Vinyl toluene-modified alkyd resin | 15.0 | 10.0 | 10.0 |
| VM and P naphtha | 40.0 | 40.0 | 40.0 |
| PGME | — | 5.0 | — |
| PGMEA | — | — | 5.0 |
| FC-22/DME (40/60) | 45.0 | 45.0 | 45.0 |
| Solubility | Sol. | Sol. | Sol. |

SOLUBILITY TABLE 6

| Formulation | Wt. % | |
|---|---|---|
| | 1 | 2 |
| Vinyl toluene-modified alkyd resin | 15.0 | 15.0 |
| VM and P naphtha | 40.0 | 30.0 |
| PGME | — | 10.0 |
| DME/A-70 (60/40) | 45.0 | 45.0 |
| Solubility | Sol. | Sol. |

SOLUBILITY TABLE 7

| Formulation | Wt. % | | | | | |
|---|---|---|---|---|---|---|
| | 1 | 2 | 3 | 4 | 5 | 6 |
| Acrylic-modified alkyd resin | 15.0 | 10.0 | 15.0 | 15.0 | 30.0 | 60.0 |
| VM and P naphtha | 40.0 | 40.0 | 70.0 | 60.0 | 25.0 | — |
| PGME | — | 5.0 | — | — | — | — |
| DME | 45.0 | 45.0 | 15.0 | 25.0 | 45.0 | 40.0 |
| Solubility | Sol. | Sol. | Insol. | Insol. | Sol. | Sol. |

SOLUBILITY TABLE 8

| Formulation | Wt. % | |
|---|---|---|
| | 1 | 2 |
| Acrylic-modified alkyd resin | 10.0 | 10.0 |
| VM and P naphtha | 40.0 | 40.0 |
| PGME | — | 5.0 |
| FC-22/DME (40/60) | 45.0 | 45.0 |
| Solubility | Sol. | Sol. |

SOLUBILITY TABLE 9

| Formulation | Wt. % | |
|---|---|---|
| | 1 | 2 |
| Acrylic-modified alkyd resin | 15.0 | 15.0 |
| VM and P naphtha | 40.0 | 30.0 |
| PGME | — | 10.0 |
| DME/A-70 (60/40) | 45.0 | 45.0 |
| Solubility | Insol. | Insol. |

SOLUBILITY TABLE 10

| Formulation | Wt. % | | | | | |
|---|---|---|---|---|---|---|
| | 1 | 2 | 3 | 4 | 5 | 6 |
| Phenol-formaldehyde/rosin-modified alkyd resin | 15.0 | 10.0 | 15.0 | 15.0 | 30.0 | 60.0 |
| VM and P naphtha | 40.0 | 40.0 | 30.0 | 70.0 | 25.0 | — |
| PGME | — | 5.0 | 10.0 | — | — | — |
| DME | 45.0 | 45.0 | 45.0 | 15.0 | 45.0 | 40.0 |
| Solubility | Sol. | Sol. | Sol. | Sol. | Sol. | Sol. |

SOLUBILITY TABLE 11

| Formulation | Wt. % | |
|---|---|---|
| | 1 | 2 |
| Phenol-formaldehyde/rosin-modified alkyd resin | 15.0 | 10.0 |
| VM and P naphtha | 40.0 | 40.0 |
| PGME | — | 5.0 |
| FC-22/DME (40/60) | 45.0 | 45.0 |
| Solubility | Sol. | Sol. |

SOLUBILITY TABLE 12

| Formulation | Wt. % | |
|---|---|---|
| | 1 | 2 |
| Phenol-formaldehyde/rosin-modified alkyd resin | 15.0 | 15.0 |
| VM and P naphtha | 40.0 | 30.0 |
| PGME | — | 10.0 |
| DME/A-70 (60/40) | 45.0 | 45.0 |
| Solubility | Insol. | Sol. |

SOLUBILITY TABLE 13

| Formulation | Wt. % | | | |
|---|---|---|---|---|
| | 1 | 2 | 3 | 4 |
| Chain-stopped alkyd resin | 15.0 | 30.0 | 60.0 | 15.0 |
| VM and P naphtha | 30.0 | — | — | — |

SOLUBILITY TABLE 13-continued

| Formulation | Wt. % | | | |
|---|---|---|---|---|
| | 1 | 2 | 3 | 4 |
| PGME | 10.0 | — | — | 10.0 |
| Methyl chloroform | — | — | — | 40.0 |
| DME | 45.0 | 70.0 | 40.0 | 35.0 |
| Solubility | Sol. | Sol. | Sol. | Sol. |

SOLUBILITY TABLE 14

| Formulation | Wt. % | | | | |
|---|---|---|---|---|---|
| | 1 | 2 | 3 | 4 | 5 |
| Short-oil alkyd resin | 15.0 | 10.0 | 15.0 | 30.0 | 60.0 |
| VM and P naphtha | 40.0 | 40.0 | 70.0 | 25.0 | — |
| PGME | — | 5.0 | — | — | — |
| DME | 45.0 | 45.0 | 15.0 | 45.0 | 40.0 |
| Solubility | Sol. | Sol. | Sol. | Sol. | Sol. |

SOLUBILITY TABLE 15

| Formulation | Wt. % | |
|---|---|---|
| | 1 | 2 |
| Short-oil alkyd resin | 15.0 | 10.0 |
| VM and P naphtha | 40.0 | 40.0 |
| PGME | — | 5.0 |
| FC-22/DME (40/60) | 45.0 | 45.0 |
| Solubility | Sol. | Sol. |

SOLUBILITY TABLE 16

| Formulation | Wt. % | |
|---|---|---|
| | 1 | 2 |
| Short-oil alkyd resin | 15.0 | 15.0 |
| VM and P naphtha | 40.0 | 30.0 |
| PGME | — | 10.0 |
| DME/A-70 (60/40) | 45.0 | 45.0 |
| Solubility | Sol. | Sol. |

SOLUBILITY TABLE 17

| Formulation | Wt. % | | | | | |
|---|---|---|---|---|---|---|
| | 1 | 2 | 3 | 4 | 5 | 6 |
| Acrylic resin | 15.0 | 15.0 | 15.0 | 15.0 | 15.0 | 30.0 |
| VM and P naphtha | 40.0 | 45.0 | 30.0 | 70.0 | 60.0 | — |
| PGME | — | 10.0 | 10.0 | — | — | — |
| DME | 45.0 | 30.0 | 45.0 | 15.0 | 25.0 | 70.0 |
| Solubility | Sol. | Sol. | Sol. | Insol. | Insol. | Sol. |

SOLUBILITY TABLE 18

| Formulation | Wt. % | | |
|---|---|---|---|
| | 1 | 2 | 3 |
| Acrylic resin | 15.0 | 15.0 | 15.0 |
| VM and P naphtha | 40.0 | 45.0 | 30.0 |
| PGME | — | 10.0 | 10.0 |
| FC-22/DME (40/60) | 45.0 | 30.0 | 45.0 |
| Solubility | Sol. | Sol. | Sol. |

SOLUBILITY TABLE 19

| Formulation | Wt. % | | |
|---|---|---|---|
| | 1 | 2 | 3 |
| Acrylic resin | 15.0 | 15.0 | 15.0 |
| VM and P naphtha | 40.0 | 45.0 | 30.0 |
| PGME | — | 10.0 | 10.0 |
| DME/A-70 (60/40) | 45.0 | 30.0 | 45.0 |
| Solubility | Insol. | Insol. | Sol. |

SOLUBILITY TABLE 20

| Formulation | Wt. % | | | |
|---|---|---|---|---|
| | 1 | 2 | 3 | 4 |
| Silicone-modified alkyd resin | 15.0 | 30.0 | 60.0 | 15.0 |
| VM and P naphtha | 30.0 | — | — | — |
| PGME | 10.0 | — | — | 10.0 |
| Methyl chloroform | — | — | — | 40.0 |
| DME | 45.0 | 70.0 | 40.0 | 35.0 |
| Solubility | Sol. | Sol. | Sol. | Sol. |

SOLUBILITY TABLE 21

| Formulation | Wt. % | | | | | |
|---|---|---|---|---|---|---|
| | 1 | 2 | 3 | 4 | 5 | 6 |
| Vinyl toluene-modified alkyd resin | 16.7 | 16.7 | 16.7 | 16.7 | 16.7 | 16.7 |
| VM and P naphtha | 13.3 | 13.3 | 13.3 | — | — | — |
| Methyl chloroform | 20.0 | 30.0 | 40.0 | 43.3 | 53.3 | 48.3 |
| DME | 50.0 | 40.0 | 30.0 | 40.0 | 30.0 | 35.0 |
| Solubility | Sol. | Sol. | Sol. | Sol. | Sol. | Sol. |

SOLUBILITY TABLE 22

| Formulation | Wt. % | | | |
|---|---|---|---|---|
| | 1 | 2 | 3 | 4 |
| Vinyl toluene-modified alkyd resin | 16.7 | 16.7 | 16.7 | 16.7 |
| VM and P naphtha | 13.3 | 13.3 | 13.3 | — |
| Methyl chloroform | 20.0 | 30.0 | 40.0 | 43.3 |
| FC-22/DME (40/60) | 50.0 | 40.0 | 30.0 | 40.0 |
| Solubility | Sol. | Sol. | Sol. | Sol. |

SOLUBILITY TABLE 23

| Formulation | Wt. % | | |
|---|---|---|---|
| | 1 | 2 | 3 |
| Acrylic resin | 15.0 | 15.0 | 15.0 |
| VM and P naphtha | — | 10.0 | — |
| PGME | — | — | 10.0 |
| Methyl chloroform | 50.0 | 40.0 | 40.0 |
| DME | 35.0 | 35.0 | 35.0 |
| Solubility | Sol. | Sol. | Sol. |

SOLUBILITY TABLE 24

| Formulation | Wt. % | | |
|---|---|---|---|
| | 1 | 2 | 3 |
| Acrylic resin | 15.0 | 15.0 | 15.0 |
| VM and P naphtha | — | 10.0 | — |
| PGME | — | — | 10.0 |
| Methyl chloroform | 50.0 | 40.0 | 40.0 |
| FC-22/DME (40/60) | 35.0 | 35.0 | 35.0 |
| Solubility | Sol. | Sol. | Sol. |

SOLUBILITY TABLE 25

| Formulation | Wt. % |
|---|---|
| | 1 |
| Nitrocellulose resin | 55.0 |
| DME | 45.0 |

SOLUBILITY TABLE 25-continued

| Formulation | Wt. % 1 |
|---|---|
| Solubility | Sol. |

SOLUBILITY TABLE 26

| Formulation | Wt. % | | | |
| --- | --- | --- | --- | --- |
| | 1 | 2 | 3 | 4 |
| Dow Corning #804 | 15.0 | 60.0 | — | — |
| Dow Corning #840 | — | — | 15.0 | 60.0 |
| VM and P naphtha | 40.0 | — | 40.0 | — |
| DME | 45.0 | 40.0 | 45.0 | 40.0 |
| Solubility | Sol. | Sol. | Sol. | Sol. |

What is claimed is:

1. A solvent-based aerosol paint in an aerosol dispensing container comprising
   (a) an effective amount of dimethyl ether as solvent or solvent and propellant and,
   (b) a non-aqueous paint resin formulation which contains a paint resin and a coalescing solvent, said paint resin selected from the group consisting of styrene-modified alkyd resins, vinyl toluene-modified alkyd resins, acrylic-modified alkyd resins, phenol-formaldehyde/rosin-modified alkyd resins, silicone-modified alkyd resins, short-oil and oil-free alkyd resins, chain-stopped alkyd resins, nitrocellulose resins, silicone resins and acrylic resins, said acrylic resins containing at least some alkyl groups with less than four carbon atoms, said paint resin capable of being sprayed satisfactorily from an aerosol can and which upon drying provides a flexible, durable, non-tacky film.

2. The solvent-based aerosol paint of claim 1 further comprising difluorochloromethane as a propellant in admixture with dimethyl ether.

3. The solvent-based aerosol paint of claim 1 further comprising a blend of low-molecular weight hydrocarbons as propellant in admixture with dimethyl ether.

4. The solvent-based aerosol paint of claim 1 wherein the dimethyl ether is present in an amount between about 10 and 60 percent of the weight of the total solvent-based aerosol paint.

5. The solvent-based aerosol paint of claim 2 wherein the admixture of dimethyl ether and difluorochloromethane is an azeotrope containing 60 wt. percent DME and 40 wt. percent difluorochloromethane and the azeotrope of dimethyl ether and difluorochloromethane is present in an amount between about 10 and 60 wt. percent of the total solvent-based aerosol paint.

6. The solvent-based aerosol paint of claim 3 wherein the admixture of dimethyl ether and the blend of low-molecular weight hydrocarbons is present in an amount between about 10 and 60 wt. percent of the total solvent-based aerosol paint.

7. The solvent-based aerosol paint of claim 1 further comprising methyl chloroform in admixture with dimethyl ether.

8. The solvent-based aerosol paint of claim 1 further comprising a mixture of dimethyl adipate, glutarate and succinate in admixture with dimethyl ether.

9. The solvent-based aerosol paint of claim 1 further comprising about 10–60 wt. percent dimethyl ether and about 90–40 wt. percent of the non-aqueous paint resin formulation.

10. The solvent-based aerosol paint of claim 1 further comprising about 15–45 wt. percent dimethyl ether and about 85–55 wt. percent of the non-aqueous paint resin formulation.

11. The solvent-based aerosol paint of claim 1 further comprising about 25–45 wt. percent dimethyl ether and about 75–55 wt. percent of the non-aqueous paint resin formulation.

12. The solvent-based aerosol paint of claim 1 further comprising about 10–60 wt. percent of an admixture of dimethyl ether and difluorochloromethane and about 90–40 wt. percent of the non-aqueous paint resin formulation.

13. The solvent-based aerosol paint of claim 1 further comprising about 10–60 wt. percent of an admixture of DME and a blend of low-molecular weight hydrocarbons and about 90–40 wt. percent of the non-aqueous paint resin formulation.

* * * * *